April 18, 1944.   E. M. KRATZ   2,346,765
APPARATUS FOR MAKING SHEET MATERIAL
Original Filed Sept. 12, 1938   9 Sheets-Sheet 1

Inventor:
Edouard M. Kratz
By Soans, Pond + Anderson Attys.

April 18, 1944. E. M. KRATZ 2,346,765
APPARATUS FOR MAKING SHEET MATERIAL
Original Filed Sept. 12, 1938 9 Sheets-Sheet 6

Inventor
Edouard M. Kratz
By Soans, Pond & Anderson Attys.

April 18, 1944.  E. M. KRATZ  2,346,765
APPARATUS FOR MAKING SHEET MATERIAL
Original Filed Sept. 12, 1938    9 Sheets-Sheet 7

Patented Apr. 18, 1944

2,346,765

UNITED STATES PATENT OFFICE 2,346,765

APPARATUS FOR MAKING SHEET MATERIAL

Edouard M. Kratz, Ogden Dunes, Ind., assignor, by mesne assignments, to Carbide and Carbon Chemicals Corporation, New York, N. Y., a corporation of New York Original application September 12, 1938, Serial No. 229,509. Divided and this application August 29, 1940, Serial No. 354,641

4 Claims. (Cl. 18—15)

This invention relates to an improved method and apparatus for making webs or sheets from film forming materials such as casein or synthetic resin solutions, for example.

This application is a division of my copending application, Serial No. 229,509, filed September 12, 1938.

The main objects of the invention are to provide a method and apparatus by which high speed production of sheeting or webbing of the character indicated may be carried on; to provide a method and apparatus for the purpose indicated whereby a sheet or web of very thin but uniform thickness may be produced; to provide a method and means whereby a soft and pliable sheet may be formed; and in general, it is the object of this invention to provide an improved method and apparatus for the purpose indicated.

Other objects and advantages of the invention will be understood by reference to the following specification and accompanying drawings (nine sheets) wherein there is illustrated the improved apparatus for making sheet material by the improved method.

In the drawings:

Figs. 18 and 19 are plan and side elevations of the intermediate portion of the drying apparatus;

Figures 1, 2:
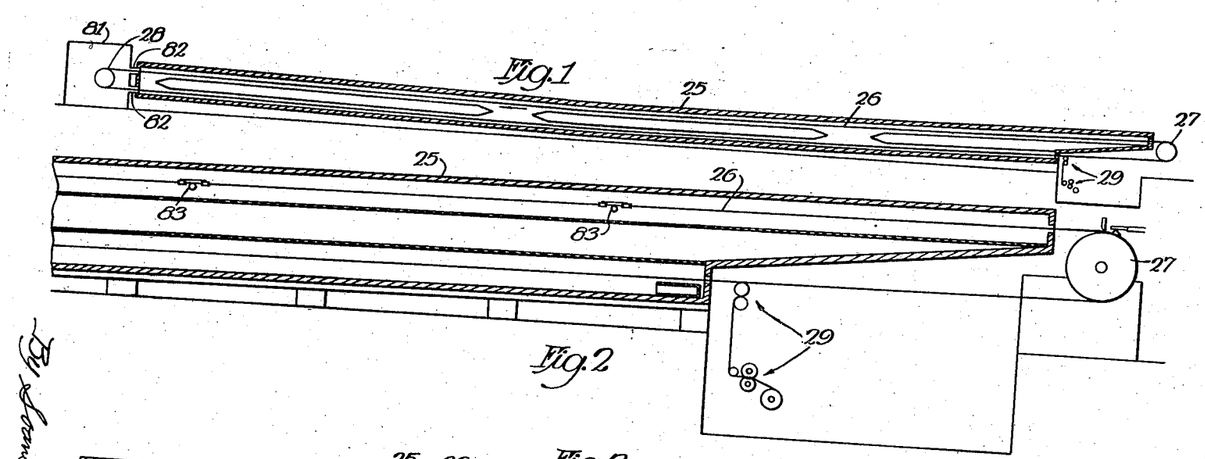
Fig. 1 is a more or less diagrammatic representation of the improved apparatus.
Figs. 2, 3 and 4 are longitudinal sections respectively, Figs. 2 and 4 illustrating the opposite end portions and Fig. 3 illustrating the portions of the apparatus intermediate the opposite end portions.

The improved apparatus herein contemplated embodies a metallic belt 25 which may be of brass, stainless steel or other metals provided with a suitably polished or otherwise treated, coated or plated surface. If brass is employed it may be buffed to a very high polish and if steel is employed in the belt a satisfactory surface may be provided by plating the belt with nickel or some other metal which produces a satisfactory, smooth finish. In one embodiment of the apparatus the conveyor 25 is approximately one hundred and sixty feet long. The film forming solution is delivered to the belt where it passes around a drum 26. The solution is spread to form a film of the desired thickness on the conveyor belt 25 which carries the film into a drying oven. As shown in Figure 1, the oven is represented in its entirety at 27.

The oven 27 is divided into three sections, each of which is supplied with hot air, the arrangement including means whereby the temperature of the air supplied to each section may be controlled and adjusted independently of the other sections.

The conveyor belt 25 is supported at one end by the drum 26 and at its other end by a drum or roller 28. The film of material adheres to the belt to such an extent that the film will continue to travel with the belt on its return reach until the film is separated from the belt and conducted to winding mechanism indicated at 29.

As indicated in Figure 1, the belt 25 is supported solely by the rolls or drums 26 and 28. The oven 27 is shaped longitudinally to correspond to the common catenary curve of the belt, thereby avoiding the provision of excess space in the oven which would absorb some of the heat supplied to it and thereby hinder the drying operation. The oven 27 may be made of suitable material, for example, galvanized sheet metal on an angle iron or like frame structure. The oven may and preferably should be provided with suitable thermal insulation to assist in maintaining the desired temperatures therein. Such details of the oven construction are not herein illustrated since they are not a part of the present invention.

When the protein sheet is to be formed from a base of casein solution, the casein solution or dispersion has added to it a predetermined proportion of formaldehyde, or other suitable hardening or setting agent. The solution, or dispersion, begins to set almost as soon as formaldehyde is added to it. It is desirable that the solution be delivered to the sheet or web forming apparatus before the solution sets to any appreciable extent. Accordingly, the present apparatus provides for the mixing of the casein solution with the proper amount of formaldehyde at a point immediately preceding the delivery of the solution to the forming apparatus.

Figure 5:
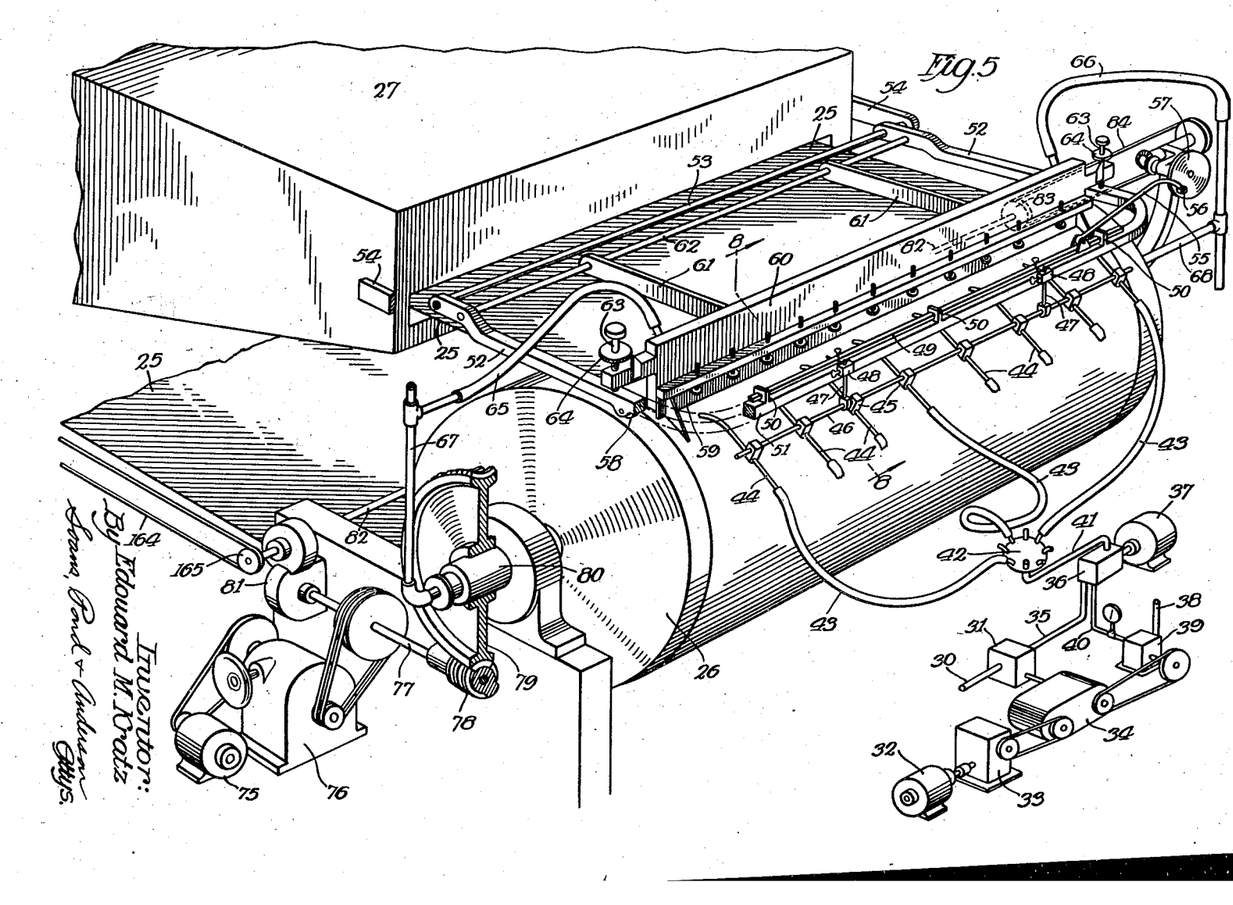
Fig. 5 is a perspective illustrating the portions of the apparatus where the liquid material is delivered to it for formation into a sheet.

As best shown in Figure 5, the casein solution is conducted to the apparatus by a pipe line 30 which is connected with any suitable source of supply. The pipe line 30 conducts the material to a pump 31 which is actuated by an electric motor 32 to a suitable speed reducing device 33 and a variable speed driving device, 34. The pump 31 delivers the casein solution through a pipe line 35 to a mixing device 36 which is actuated by electric motor 37 or by other suitable means. The formaldehyde solution is conducted from a suitable source of supply by a pipe line 38 to a pump 39 which is actuated by the motor 32 through the speed reducing and speed controlling units 33 and 34. The pump 39 delivers the formaldehyde through a pipe line 40 into the mixer. By suitable valves not herein illustrated, or by proper selection of the capacities of the pumps 31 and 39, the proportion of the formaldehyde and casein solutions may be accurately controlled. Also, the volume of these materials delivered to the mixture may be controlled by adjustment of the speed controlling device 34.

The casein and formaldehyde mixture is delivered by a pipe line 41 from the mixer 36 to a header or manifold 42, which is provided with a multiplicity of (in this case, eight) discharge outlets which are respectively connected by flexible hoses such as 43 to nozzles or delivery pipes 44.

When synthetic resin and other film forming solutions are employed, the foregoing described arrangement for injecting the hardening, or any similar agent, into the solution immediately before delivery thereof to the film forming belt, may not be required. In that event, the pipe 30 may lead directly to the distributing head 42.

Figures 8, 9:
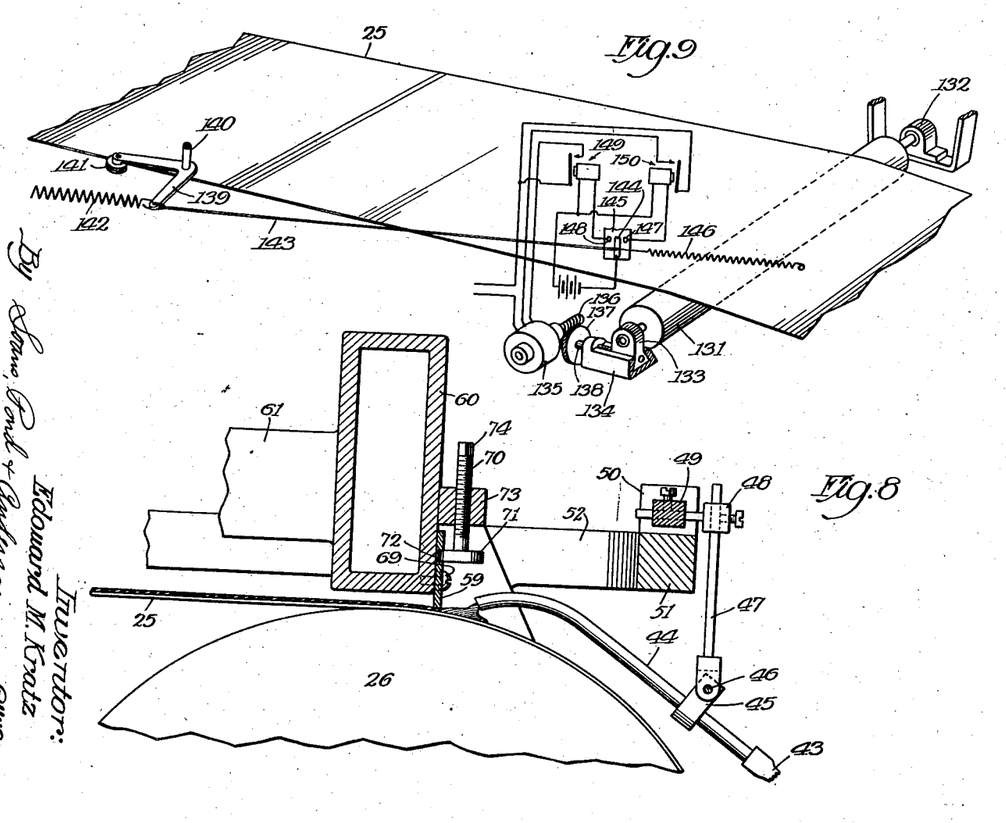
Fig. 8 is a sectional illustration showing in detail the arrangement for delivering the liquid material to the apparatus and for forming the sheet from such liquid material.
Fig. 9 is a perspective, illustrating an arrangement for controlling sidewise shifting of a belt or band on which the sheet material is carried for drying purposes.

The nozzles 44 are mounted so that their relationship to the surface of the belt 25 may be adjusted to produce the desired results. As shown in Figures 5 and 8, each of the nozzles is carried by a block 45, each of which is mounted on a rod 46. The blocks 45 may be provided with set screws (not shown) for locking the blocks and the nozzles in any desired position of adjustment relative to the conveyor belt, or if preferred, the blocks 45 may be fixedly mounted on the said rod 46 and the rod mounted for rotatable adjustment so that all of the nozzles may be simultaneously adjusted relative to the conveyor belt. It will, of course, be understood that both forms of adjustment may be provided.

The nozzle supporting rod 46 is carried in this instance by means of a pair of hangers 47, 47 which are vertically slidably mounted in members 48, 48. The members 48, 48 are in turn horizontally slidably mounted in a bar 49. The bar 49 is supported for reciprocation in a direction transverse to the travel of the conveyor belt 25. For this purpose the bar 49 is supported by bearing members 50 which are carried by a U-shaped frame element 51. The U-shaped member 51 is pivotally mounted at the free ends of its side legs 52, 52 on a rod 53 which is carried by suitable bracket arms 54, 54 which are formed integral with or attached to conveniently located frame portions of the apparatus.

To effect reciprocation of the bar 49 and thereby reciprocation of the nozzles 44 crosswise of the direction of travel of the belt 25, the bar is connected by means of a link 55 to a crank pin 56 carried by a rotatably driven member 57. The latter may be mounted for rotation in any conveniently provided bracket and it may be driven by any suitable arrangement. It will be observed that the revolution of the crank pin 56 will be transmitted by the link 55 to the bar 49 which will be reciprocated accordingly.

The U-shaped element 51 is provided with rollers such as 58 which are adapted to engage the marginal portions of the surface of the drum 26 beyond the respective edges of the conveyor belt 25. A doctor blade 59 is adjustably mounted on a transversely extending supporting member 60. The supporting member 60 is provided with laterally extending arms 61, 61 which are pivotally mounted at their free ends on a rod 62 which is mounted at its ends in the side members 52 of the U-shaped member. Provision for adjusting the doctor blade carrying member 60 vertically relative to the conveyor member 25, consists in this instance of screws such as 63 which threadedly engage suitably tapped openings in the opposite end portions of the supporting member 60. The screws 63 may be turned until their lower ends rest on the U-shaped member 58. It will be apparent that by adjusting the screws 63, the doctor blade and its supporting member 60 may be adjusted to or from the conveyor member 25. A lock nut or similar device indicated at 64 may be provided on the screws 63 for locking the latter in the desired adjusted position.

The member 60 is preferably made hollow as indicated in Figure 8 and a heating medium such as hot water may be supplied therethrough by a flexible hose connection 65 and drained therefrom by a similar connection indicated at 66. The drum 26 is also preferably hollow and adapted to have its temperature controlled by supplying to the interior of the drum hot water or the like, the same being supplied through a supply pipe 67 and drained therefrom by a pipe 68.

The doctor blade 59 may be secured to the supporting member 60 through the agency of screws such as indicated at 69. Provision for adjusting the doctor blade relative to the supporting member 60 may include screws such as indicated at 70 provided with headed ends 71 which fit into slots or grooves 72 provided in the doctor blade 59. The screws 70 threadedly engage a suitably tapped opening in bosses such as indicated at 73 which may be carried by the supporting member 60. The upper ends of the screws are preferably squared or otherwise treated as indicated at 74 to facilitate turning of the screws. By turning the screws 74 after loosening the screws 69, the doctor blade 59 may be adjusted. As indicated in Figure 5, the last described adjusting means is supplied at relatively short intervals along the length of the doctor blade so that accurate localized adjustment of the doctor blade may be made. By this means accuracy or uniformity of the thickness of the film of material permitted to pass under the doctor blade on the conveyor belt may be accurately controlled.

By mounting the nozzles on a pivotally mounted frame such as the frame 51, it is made very easy to swing the entire delivery mechanism and doctoring mechanism upwardly away from the conveyor belt to facilitate cleaning or other operations on the belt or drum or adjacent parts of the apparatus. Also, by mounting the nozzles 44 for reciprocation transversely, the formation of ridges in the casein solution adjacent the doctor blade is eliminated. It will be understood that in the event that the delivery nozzles were to remain stationary, the material delivered to the conveyor belt would spread out approximately uniformly on the belt but that where adjacent streams of the material come together they would tend to pile up to form ridges of material. Formation of such ridges is somewhat objectionable in that it tends to interfere with uniformity of the web formed on the apparatus.

As best shown in Figure 5, the drum 26 (and thereby the belt 25) is driven from a suitable source of power such as an electric motor indicated at 75. The motor 75 is suitably connected to a variable speed controlling unit 76 which in turn drives a suitably journalled shaft 77. The shaft 77 is equipped with a worm gear 78 which meshes with a worm wheel 79 mounted on the tubular shaft 80 of the drum 26.

The shaft 77 is also connected through the agency of suitable gear connections enclosed in a housing such as indicated at 81 to a shaft 82. The shaft 82 extends transversely of the machine and is equipped at the opposite side of the apparatus with a pulley or sprocket represented at 83 which is connected by a chain or belt designated 84 to means for driving the rotating member 57.

It will be evident that a supply of casein and formaldehyde solution delivered to the band or belt 25 by the nozzles 44 will be formed into a web of uniform thickness on the belt incident to the travel of the belt under the doctor blade. The web of material on the belt enters the upper portion of the adjacent end of the drying oven 27 as best shown in Figure 1.

It is subjected to heat as soon as it enters the drying oven. Hot air is initially supplied to the oven adjacent the other or far end thereof, that is, adjacent the belt supporting roll or drum 26. For convenience, in reference to the latter end of the apparatus, it will be identified by the reference numeral 85.

Figure 22:
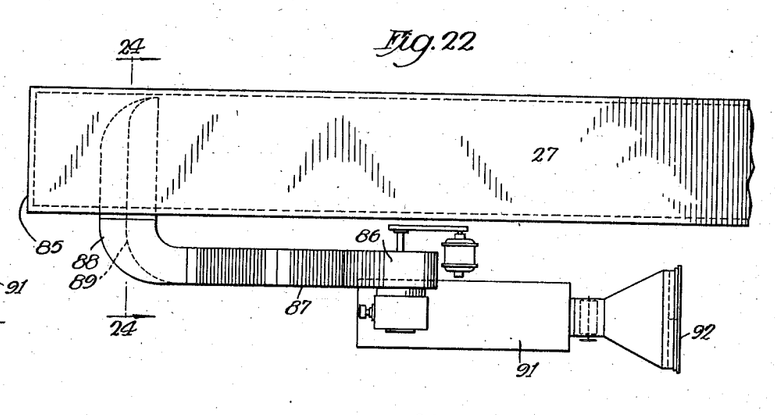
Figs. 22 and 23 are plan and side views respectively, of another portion of the drying apparatus.
Figure 23:
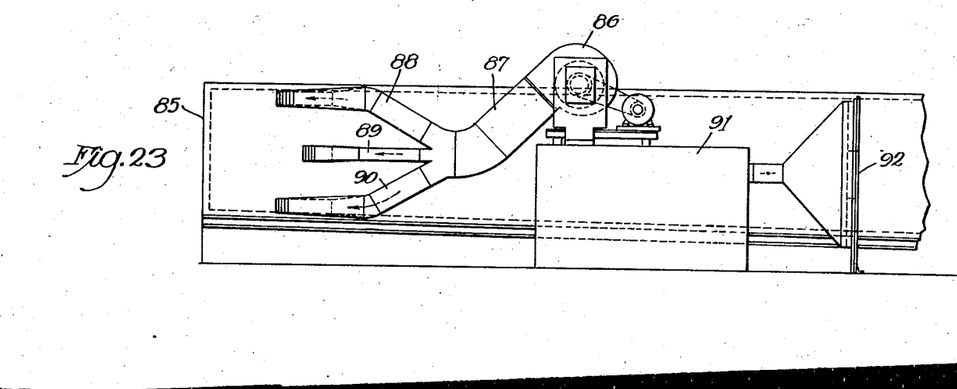
Figure 24:
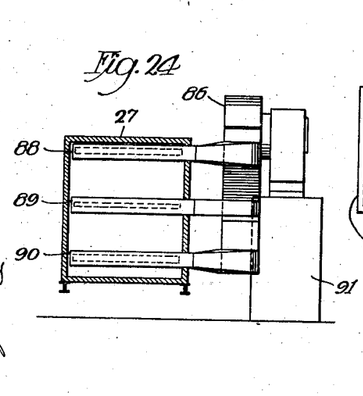
Fig. 24 is a section on the line 24—24 of Fig. 22.

Referring to Figures 22 to 24, inclusive, it will be seen that there is provided a blower 86 connected by a conduit 87 to branching conduits 88, 89 and 90. The conduits 88, 89 and 90 are respectively connected to the end portion 85 of the oven near the top, central and bottom portions thereof as shown. By this arrangement, a desirable uniformity of the distribution of hot air is obtained in the oven. The blower 86 is connected to a heating unit 91 which pre-heats air supplied thereto through a suitable filtering device indicated at 92. By employing the filtering device 92, dust and other foreign matter is adequately removed from the air which is heated and delivered to the oven so that the protein sheet formed on the conveyor belt is kept clean and free from dust and other matter which might impair its finish. Suitable thermostatic controls (not shown) may be provided for governing the temperature to which the air is heated by the heating unit 91.

A similar heating arrangement is provided for supplying hot air to the intermediate portion of the oven, such arrangement being illustrated in Figures 18 to 21, inclusive. By reference to the last mentioned figures, it will be seen that there is provided a blower 93 which is connected by a conduit 94 to conduit branches 95, 96 and 97, which enter the oven 27 by means of delivery nozzles which direct the air away from the adjacent exhaust connections as most clearly shown in Figure 19. The air supplied to the branches 95, 96 and 97 is obtained primarily from the adjacent end portion of the furnace to which hot air is supplied by the blower 86. For this purpose there is provided a conduit 98 which has vertically spaced exhaust connections indicated at 99, 99 to the oven immediately preceding the point to which hot air is delivered thereto by the branches 95, 96 and 97. The conduit 98 also has an intermediate connection indicated at 100 which connects with both the upper and lower sections of the furnace. By reference to Figures 1 to 4, inclusive, it will be observed that the oven is provided interiorly with hollow sheet metal fillers designated 101, 102 and 103, respectively, which in effect divide the furnace into upper and lower passes for the upper and lower reaches of the conveyor belt 25. By providing the inlet and exhaust connections closely adjacent each other as illustrated, the effect is obtained of having a transverse wall in the oven intermediate the adjacent ends of the fillers 101, 102 and 103. It is likely that some of the hot air from one section of the furnace passes directly into the other section but the volume thereof is so small that it has no objectionable effect on the re-heated air which is supplied through conduits such as 95, 96 and 97.

A fresh supply of air may also be injected into the furnace by the blower 93, and an intake 104 being suitably connected to the conduit 98 for this purpose. The inlet 104 is also preferably provided with means for filtering the fresh air drawn into the system and a heating unit 105, similar to the heating unit 91, is provided for heating the air delivered to it by the conduit 98.

Figures 3, 4:
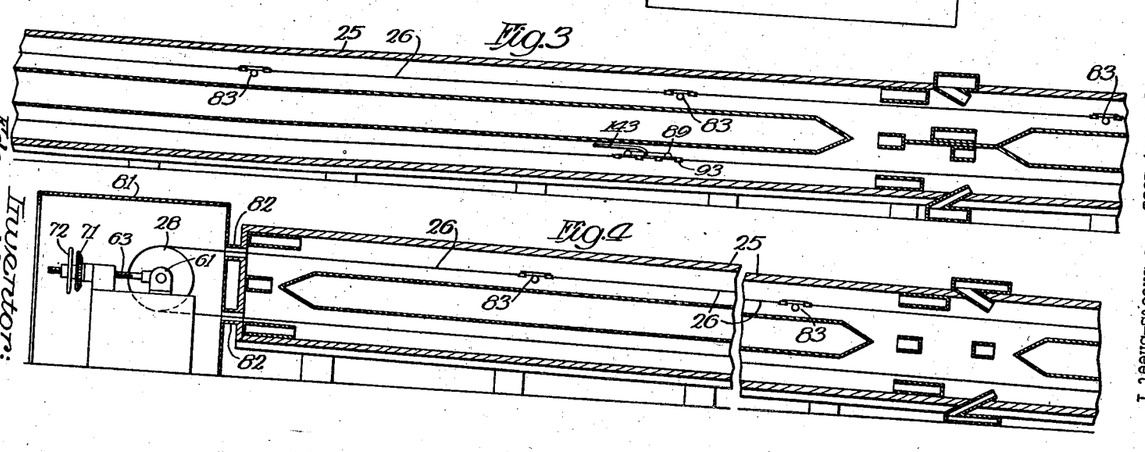
Figure 15:
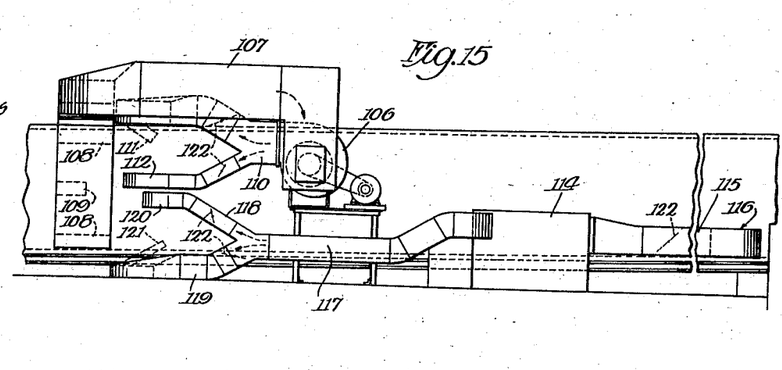
Figure 17:
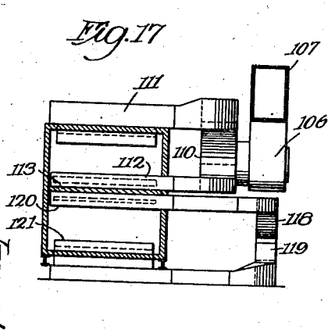
Figure 18:
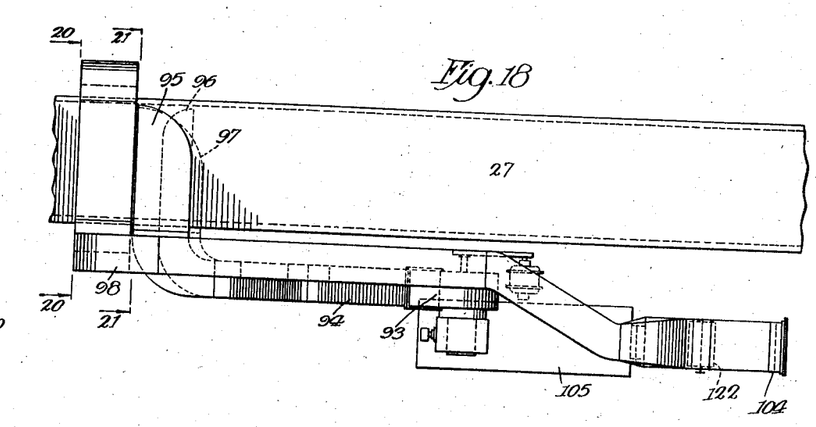
Figure 19:
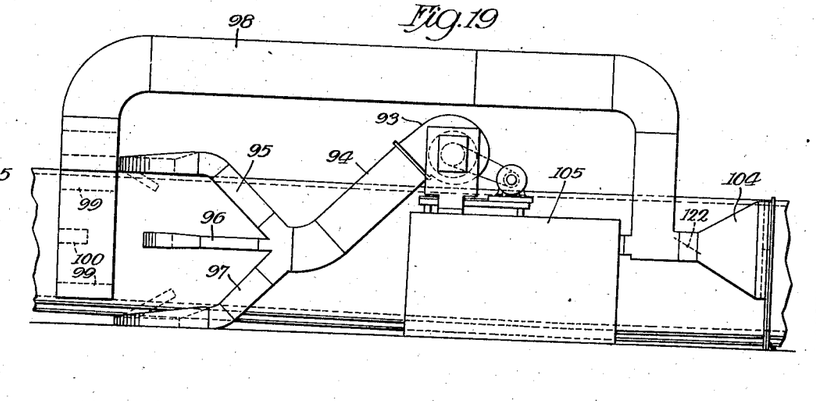
Figure 20:
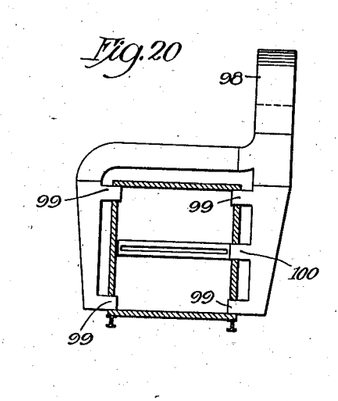
Figs. 20 and 21 are sections, respectively, on the lines 20—20 and 21—21 of Fig. 18.
Figure 21:
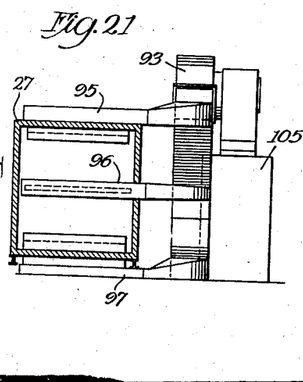

Hot air is supplied to the receiving end portion of the furnace by means of a blower 106. The blower 106 receives the hot air from a conduit 107 which has exhaust connections 108, 108 to the upper and lower passes of the intermediate section of the furnace and also an intermediate connection 109. The hot air drawn from the intermediate furnace section is blown by the blower 106 through a delivery conduit 110 to branch conduits 111 and 112, which communicate as best shown in Figures 3, 15 and 17 with the upper chamber or pass of the furnace.

To more effectively separate the upper and lower passes of the furnace from each other, there is provided a divider 113 as indicated. For practical purposes it is neither necessary nor desirable to re-heat the air before its delivery to the receiving end portion of the furnace, wherefor there is provided no means for heating the air delivered by the blower 106; however, it will be understood that if it should be desired to re-heat the air, heating units such as 91 and 105 may be provided and suitably interposed in the air circuit.

The lower section or pass of the furnace under the receiving end portion of the upper pass is preferably supplied with tempered and humidified air supplied thereto by an air conditioning unit 114. The air conditioning unit 114 may include a suitable blower for impelling the air therethrough and it is connected by means of a conduit 115 to an inlet in the delivery end portion of the lower pass of the furnace, as indicated at 116. The air exhausted from the delivery end of the lower pass of the furnace through the conduit 116 is returned to the lower pass of the furnace through a conduit 117 which has branches 118 and 119, respectively, connected as indicated at 120 and 121 to the top and bottom of the lower pass of the furnace as best shown in Figures 3, 15 and 17. Dampers such as indicated at 122 may be provided in the various conduits wherever desired for controlling the volume or velocity of the air drawn from and delivered to the various portions of the furnace.

It has been found that a metal conveyor belt or band such as 25 tends to curl transversely of its length, i. e., buckle so that on its upper reach it is lower in its middle than at its edges. For the purpose of counteracting the tendency of the belt to buckle as explained, there is provided straightening apparatus shown in Figures 10 to 13, inclusive. Such apparatus is located at a convenient point, preferably about the middle of the length of the conveyor or at the closest point of the catenary curve of the belt. The device in its entirety is indicated at 123 in Figure 3 and a similar device for straightening the lower reach of the belt is indicated at 124.

Figure 10:
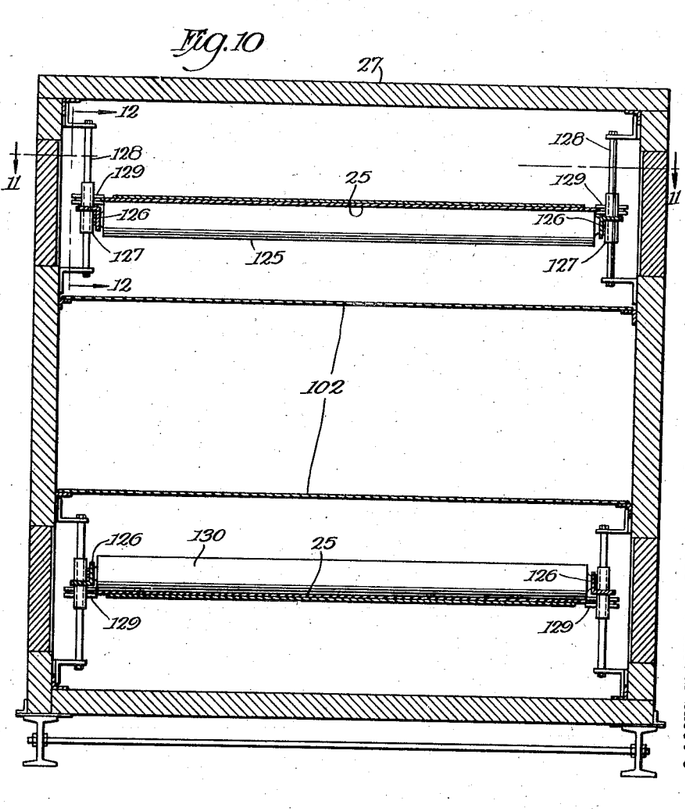
Fig. 10 is a section on the line 10—10 of Fig. 3.
Figure 11:
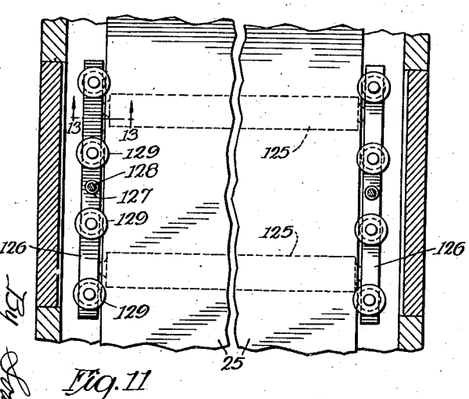
Figs. 11 and 12 are sections respectively on the lines 11—11 and 12—12 of Fig. 10.
Figure 12:
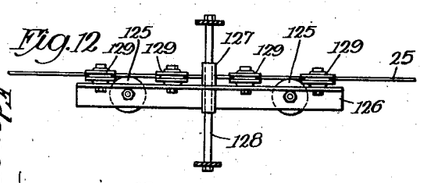
Figure 13:
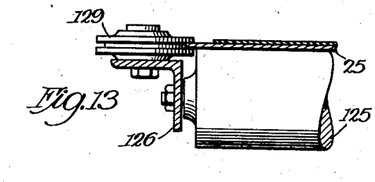
Fig. 13 is a section on the line 13—13 of Fig. 11.
Figures 14, 16:
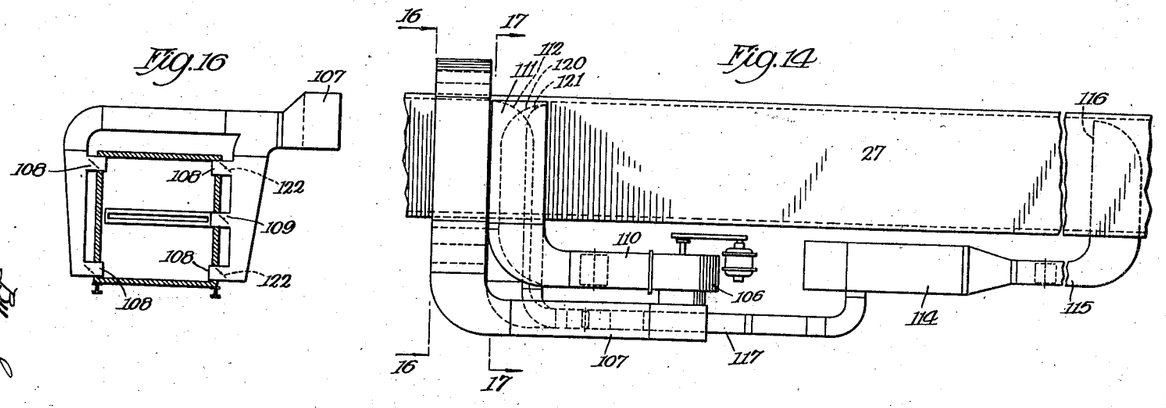
Figs. 14 and 15 are plan and side views of a portion of the apparatus for drying the sheet material.
Figs. 16 and 17 are sections, respectively, on the lines 16—16 and 17—17 of Fig. 14.

The device 123 for counteracting the tendency of the upper reach of the belt to buckle comprises a pair of rolls 125, 125 which are rotatably mounted at their opposite ends in angle iron or other suitable frame pieces 126. The frame pieces 126 and the parts carried thereby are provided with axially vertical bearing elements 127 which slidably fit on vertically extending guide rods 128. The guide rods 128 are supported by means of suitable brackets as indicated in Figure 10 which are in turn secured to the frame work or sides of the oven. The rolls 125, 125 underlie the upper reach of the conveyor band 25 and the latter is maintained in contact with the rolls 125 across the entire width of the band by means of a series of grooved rollers 129 which are rotatably mounted on the frame members 126. The grooves in the rollers 129 are made deep enough to receive sufficiently wide marginal portions of the belt to prevent said marginal portions from springing out of the grooves. Hence the frame members 126 and the parts carried thereby are, in effect, suspended from the side marginal portions of the conveyor belt. The weight of the straightening apparatus is such that it is enough to hold the conveyor band to a substantially flat condition transversely of its length and in which condition the band will engage the entire length of the rolls 125. The weight of the straightening device is not sufficient to effect inverted buckling, the latter being resisted by the support of the rolls 125. It will be observed that the straightening apparatus described more or less floats on the guide members 128, 128, the device being supported by the engagement of the grooved rollers 129 with the opposite margins of the belt.

The lower or return reach of the belt has the same tendency to buckle but the marginal portions of the belt in the lower reach tend to assume a position lower than the central portion of the belt. For the purpose of resisting such tendency in the lower reach of the belt a floating structure substantially like that above described is employed but the rolls 125 are replaced by rolls 130 which engage the top surface of the lower reach of the belt. The device is, however, more or less floatingly supported by engagement of grooved rollers such as 129 with the marginal portions of the conveyor belt.

Because of unavoidable inaccuracies in adjustment of the drums or reels 26 and 28 relative to each other, or due to other causes, there is a tendency for the conveyor belt to shift sidewise; to control and counteract such tendency there is provided a guiding or steering roll 131 (see Figures 6 and 9) which underlie the lower reach of the belt at a convenient point outside of the drying furnace. The roll 131 is journalled at one end in a suitable bearing 132 and at its other end in a bearing 133 which is mounted for lateral adjustment in a supporting member 134. The bearing 133, in a neutral position, would be so located that the axis of the steering roll 131 would be exactly perpendicular to the length of the belt 25. To steer the belt to one side or the other the roll 131 is adjusted to an inclined position relative to the length of the conveyor belt with the result that it effects the desired shifting of the belt.

For effecting shifting of the roll 131 to inclined position for the purpose indicated, there is provided a reversible electric motor 135 which is equipped with a worm gear 136 meshing with a worm wheel 137. The worm wheel 137 is secured to one end of a shaft 138 which is journalled in a suitable portion of the supporting member 134 and provided with screw threaded engagement with the bearing 133. It will be apparent that when the motor 135 is energized to rotate in either direction, the bearing member 133 will be shifted one way or the other so as to cause the roll 131 to assume the desired angular position.

The operation of the motor 135 is controlled by a gauging device comprising a bell crank 139 which is pivotally mounted intermediate its ends on a suitable post 140 which is secured to the frame work of the apparatus. The free end of one arm of the bell crank 139 is equipped with a roller 141 which is grooved to receive the marginal portion of the conveyor belt 25. The free end of the other arm of the bell crank is connected by a spring 142 to a fixed part of the frame work of the apparatus, such spring tending to rock the bell crank 139 in the proper direction to maintain the roller 141 in engagement with the edge of the conveyor belt. The free end of said other arm of the bell crank is also connected by means of a wire or rod 143 to a movable switch arm or contact member 144 of a two-way switch 145. A spring 146 connected between said switch arm 144 and a fixed point serves to pull the switch arm 144 in a crosswise direction (as diagrammatically represented in Figure 9) to make contact with a contact element 147 of the switch. Such movement of the switch arm is, of course, permitted only when the bell crank 139 is rocked by outward movement of the roller 141 resulting from shifting of the conveyor belt in one direction. In the event that the conveyor belt shifts in the other direction and permits the spring 142 to pull the rod 143, the switch arm 144 will be caused to engage the contact element 148 of the switch 145.

The two-way switch 145 is connected with suitable relays indicated at 149 and 150 which respectively control electrical circuits for operating the motor 135 in opposite directions. It will be seen that by proper adjustment of the two-way switch 145, the extent to which the conveyor belt 25 may shift sidewise may be effectively limited and controlled.

Figure 6:
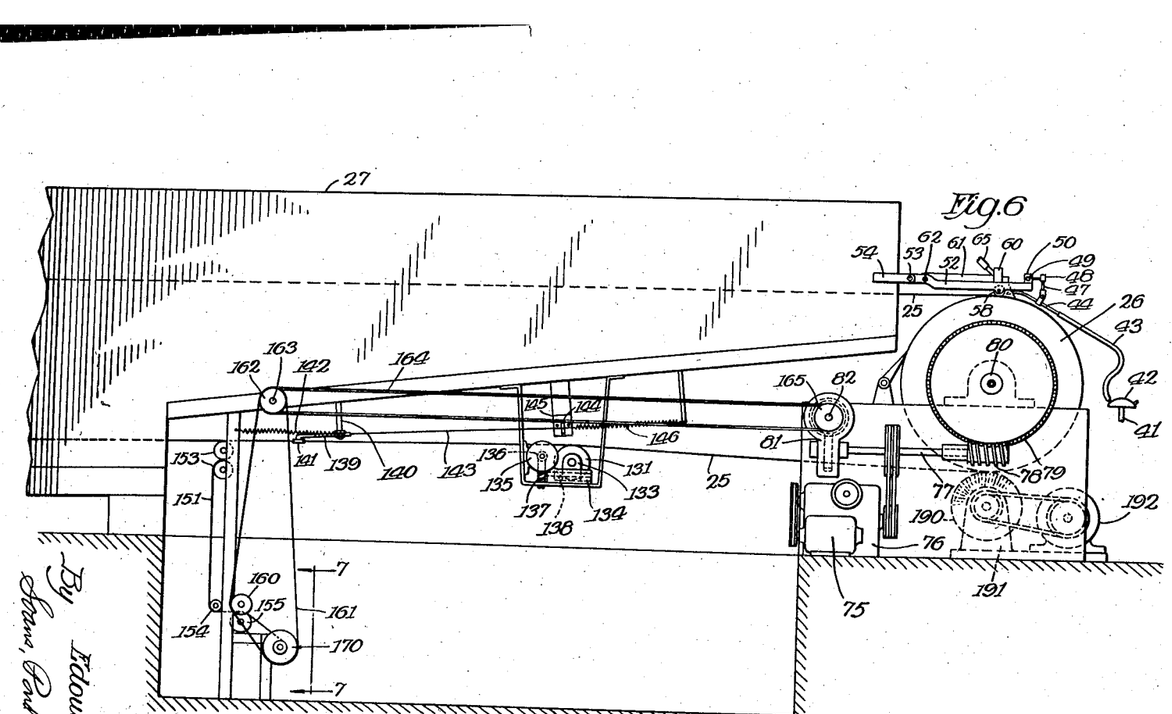
Fig. 6 is a side elevation of the mechanism shown in Fig. 5 together with certain other mechanism at the receiving end of the apparatus.
Figure 7:
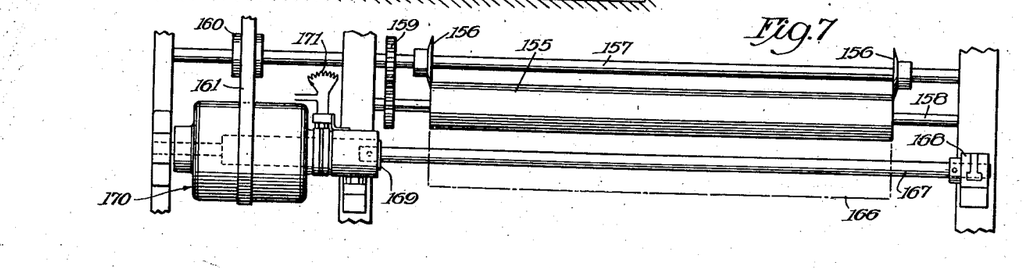
Fig. 7 is an elevation of an end portion of the apparatus as indicated by the line 7—7 of Fig. 6.

The film which is designated 151 is removed from the conveyor belt 25 closely adjacent the discharge outlet 152 in the drying furnace. The web or sheet of material 151 is guided around upper and lower rolls 153 as best shown in Figures 2 and 6, and then downwardly and horizontally under a guide roll 154. From the guide roll 154 the sheet 151 passes over a guide roll 155 which has associated with it trimming wheels 156, 156 for trimming the sides of the web so as to provide straight edges and to make the width of the sheet uniform throughout its length. As best shown in Figure 7, the trimming wheels 156 are mounted on a shaft 157 and they cooperate with the opposite ends of the roll 155 for trimming the sheet or web 151.

The roll 155 is carried by a shaft 158 which is suitably journalled for rotation and the shaft 157 is also rotatably supported in suitable bearings provided in frame elements as shown. The trimming wheels 156 and the roller 155 are rotated as an incident to the gearing 159 which connects the shafts 157 and 158 and the engagement of a pulley 160, carried by the shaft 157, with a driving belt 161. The belt 161 is driven by a pulley 162 (see Figures 5 and 6) which is carried by a shaft 163 and which shaft is driven by a belt 164. The belt 164 is driven by engagement with a pulley 165 carried by the driven shaft 82.

The material to be wound or reeled is wound on a suitable core such as indicated at 166 which may be carried by a shaft 167. The shaft 167 is journalled at one end in a bearing 168 and at its other end is supported in a suitable clutch element 169 which is connected with the armature of a magnetic coupling device indicated in its entirety at 170.

The magnetic coupling device 170 may be in the form of a modified electric motor to which current may be supplied through an adjustable or variable resistance device 171. The field portion of the coupling device may be driven by means of a belt 161 as shown in Figures 6 and 7 and as an incident to the magnetic coupling, the armature portion of the device is also driven so that the clutch element 169 will impart rotation to the shaft 167 and core 166. The magnetic coupling device 170 may be of any selected form wherefore the details thereof are not herein specifically set forth. By varying the strength of the electric current supplied to the coupling device, the tension under which the sheet is wound upon the core may be varied to suit specific requirements. If a strong current is supplied to the coupling device the sheet will be wound tightly on the core, but if a weak current is supplied the sheet will be wound less tightly. It should be noted that the travel of the conveyor belt 25 of the machine proceeds at a constant, fixed rate so that by varying the force which rotates the core 166 the winding tension is accordingly varied.

In one practical embodiment of the described apparatus, the conveyor belt 25 is operated at a speed of about fifty feet per minute. Transparent casein sheet material may be efficiently produced with the apparatus and the effective control of the drying conditions in the oven of the variable temperatures in the successive stages of the oven through which the belt travels permit the production of unusually clear, transparent material, free from discoloration by scorching or other causes resulting from the employment of heat for drying purposes. Also, by permitting a gradual increasing of the temperature to which the sheet is subjected in the drying furnace, thorough drying from the surface of the metallic belt to the outer or upper surface of the sheet is effected. In other words, the formation of a moisture retaining skin on the top surface of the sheet as an incident to the immediate application of high temperature is effectively avoided.

Figure 25:
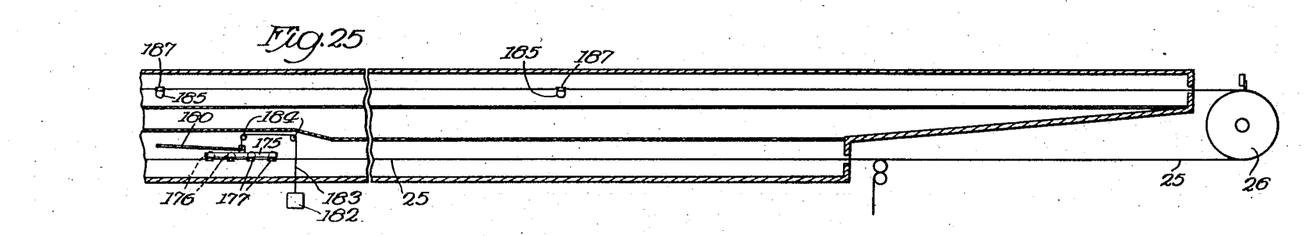
Figs. 25 and 26 correspond, respectively, to Figs. 1 and 4 of the drawings but show a modified arrangement.
Figures 26, 27, 28:
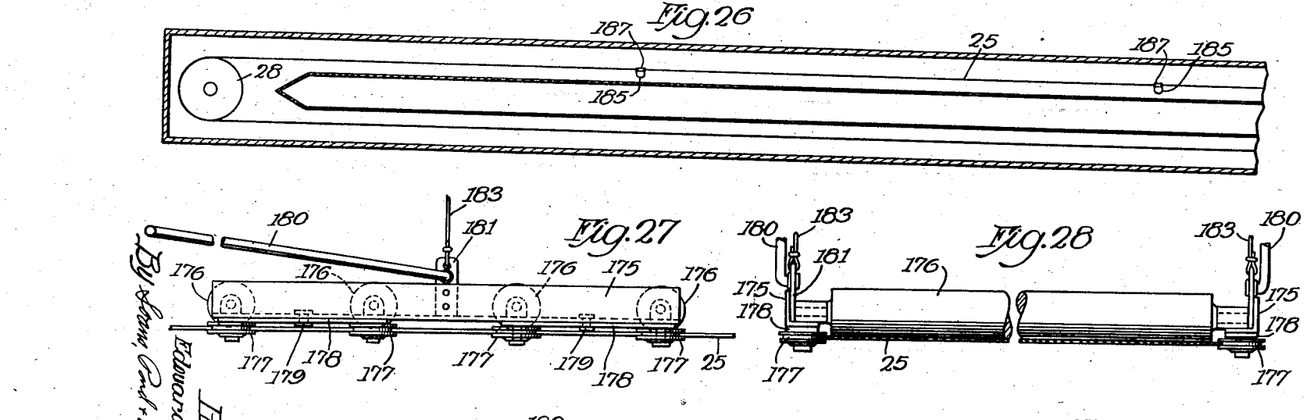
Figs. 27 and 28 are side and end views, respectively, of a form of device which may be employed if desired for conveyor belt guiding purposes.

Instead of the above described adjustable roll 131 for guiding the belt 25, relatively fixed means may be employed for maintaining the belt in its proper position relative to the receiving end drum 26. Such means is illustrated in Figures 25, 27 and 28.

The relatively fixed guiding means is movable vertically but not substantially movable transversely of the conveyor belt 25. As shown best in Figures 27 and 28, the device comprises a pair of angle iron side members 175, 175, respectively located adjacent the opposite edges of the lower reach of the belt 25. Tubular rolls 176 extend between the opposite side members and are suitably rotatably mounted in bearings carried by the said side members. For engaging the opposite edges of the conveyor belt 25, there is provided a pair of grooved wheels 177, 177, each pair of the said wheels being located substantially in alignment with the axis of each roller 176. The respective grooved wheels 177 are rotatably supported on the ends of arms 178 and are so spaced from each other that the width of the conveyor belt 25 fits between them substantially as shown. As best shown in Figure 27, the arms 178 are pivoted at 179 intermediate their ends and grooved wheels such as 177 are mounted on each end of each of the arms 178. By mounting the grooved wheels in the manner explained, self-adjustment of the grooved wheels 177 relative to the side members 175 is permitted to insure satisfactory contact between each of the grooved wheels and the edge of the conveyor belt without requiring a burdensome degree of manufacturing accuracy.

The guiding unit, comprising the side members 175, 175, and attached parts, is more or less floatingly supported, so that it may readily adjust itself to the normal vertical position of the lower reach of the conveyor belt on which it acts. As shown in Figures 25 and 27, the device is located within the last stage of the drying oven and it is connected thereto by means of links such as indicated at 180. The links 180 are pivoted at one end to the walls or frame of the drying oven and at their other ends to the side members 175 through the agency of brackets such as indicated at 181. The links 180 permit the guiding device to move vertically but restrain it from horizontal travel with the conveyor belt. The weight of the guiding device is suitably counterbalanced so that it does not impose a load on the conveyor belt. One way of counter-balancing the guiding device is to provide one or more counter-balancing weights such as 182 connected by suitable flexible means 183 extending over pulleys such as 184, and connected to the guiding device.

It has been found that the above described guiding mechanism, when mounted within the drying oven at about one-third of the length of the conveyor belt from the receiving end thereof, will be automatically maintained in proper position relative to the drum 26. The maintenance of the belt in predetermined position on the drum 26 is considerably more important than positioning of the belt on the drum 28 at the other end of the apparatus.

Figure 29:
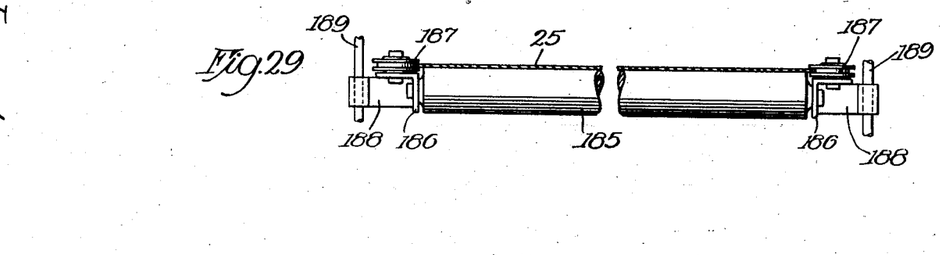
Fig. 29 is an end view of an alternative means for maintaining a conveyor belt in transversely flat condition.

As an alternative to the means 123 and 124 for maintaining the conveyor belt flat transversely, there may be provided a series of devices such as shown in Figures 25 and 29. Such devices comprise a tubular roll 185 rotatably mounted at its ends on brackets such as 186, and grooved wheels 187 receiving the opposite edge portions of the conveyor belt 25 and also rotatably mounted on the said brackets 186. As shown in Figure 29, the grooved wheels 187 are spaced from each other so that the width of the conveyor belt 25 fits between the grooved peripheries of the wheels so that the top and bottom flanges of the wheels engage surface portions of the belt to prevent its curling and to maintain the belt in flat condition against the surface of the roll 185. Such devices may be suitably mounted through the agency of brackets 188 on guide rods such as indicated at 189 which may be mounted in the oven structure substantially as above explained for the guide rods 128. However, if preferred, the rollers 185 and associated parts may be floatingly supported by means such as above described for the guiding devices comprising the rollers 176 and the grooved wheels 177. As shown in Figures 25 and 26, a series of four of the described devices are provided at suitably spaced intervals for maintaining the belt flat; more or less may be employed as desired and found advisable.

The described apparatus may be employed as already indicated for the production of sheet material of single ply thickness. However, if desired, the sheeting may be made multi-ply or laminated by the simple expedient of depositing additional coats of the forming liquid on preceding plies, which in that case are not stripped from the belt until the desired number of plies have been formed. Such material, although of laminated construction, will have the characteristics of a relatively heavy single ply sheet since the new plies tend to fuse themselves to the previously formed plies.

In some cases the first ply of material may be formed of cellulose acetate or nitrate, or any natural or synthetic resin, or rubber composition to provide a backing of water-proof or other selected character.

In some instances, it is desired to apply reading material or the like on the sheet material and this may conveniently be done by printing on the conveyor belt with suitable printing ink or the like which will adhere strongly to the sheet formed on the belt and will be stripped from the latter when the sheet is removed from the belt.

Another method of marking the sheet material which may conveniently be practiced in connection with the formation of the sheeting is to apply the desired reading or display material on the belt with suitable pigmented material such as a paint which is dull or flat, and which strongly adheres to the belt. When a sheet is stripped from a belt bearing such indicia, the sheet will disclose the same indicia in the form of frosted or like areas, corresponding to the pigmented areas on the belt.

It is desirable that means be provided for facilitating the cleaning and polishing of the conveyor belt 25. Such means may comprise a suitable buffing wheel or drum 190 rotatably supported by frame work 191 and driven by means such as an electric motor 192. The buffing drum 190 should preferably be mounted so as to be adjustable toward and from the conveyor belt so as to permit adjustment of the pressure with which the buffing drum acts on the belt. The buffing device may be operated at any desired time but it is preferable that it be not operated during the production of sheet material on the belt.

The apparatus described may be modified in various ways without sacrificing the advantages set forth in the foregoing description and without departing from the spirit of the invention, the scope of which should be determined by reference to the following claims, the same being construed as broadly as possible consistent with the state of the art.

I claim:

1. In apparatus of the class described, an endless belt conveyor supported only at its ends and of such length as to necessarily assume a substantial catenary between its ends, an oven enclosing a reach of said belt, said oven being arched longitudinally to approximate the catenary of said reach and being of such cross sectional area throughout its length as to provide between the material supporting surface of said reach and a wall of the oven, a passageway of approximately constant cross sectional area throughout the length of the oven, and means for circulating a drying medium longitudinally in said passageway in contact with the material supporting surface of said reach of the conveyor.

2. In apparatus of the class described, a horizontal endless belt conveyor supported only at its ends and of such length as to necessarily assume a substantial catenary between its ends, means for spreading liquid material on said conveyor at one end of the upper reach thereof, an oven enclosing said conveyor and provided with longitudinally extending partitioning means intermediate the upper and lower reaches of the belt for forming with the upper and lower walls respectively of the oven, separated passes for the respective reaches of the conveyor, said oven being arched longitudinally to approximate said catenary of the conveyor and being of such cross sectional area throughout its length as to provide between the material supporting surfaces of the upper and lower reaches of the conveyor and the upper and lower walls respectively of the oven, passageways of approximately constant cross sectional area throughout the length of the oven, means for circulating a drying medium longitudinally in said passageways in contact with the material supporting surfaces of the respective reaches of the conveyor, and means for removing the resulting dried film from the lower reach of the conveyor.

3. In apparatus of the class described, the combination of a horizontal endless belt conveyor embodying rolls supporting the conveyor at its ends only, said conveyor being of such length as to necessarily assume a substantial catenary between its supported ends, said rolls being of such diameter as to space the reaches of the belt a substantial distance from each other, means for depositing material on the upper reach of the belt adjacent one end thereof, an oven enclosing the belt and provided with a longitudinally extending hollow partition cooperating with the upper and lower walls of the oven to form upper and lower oven passes respectively enclosing the upper and lower reaches of the belt, said oven and partition being arched longitudinally to approximate the catenary of the belt to thereby maintain the cross sectional area of said passes substantially constant throughout the length of the oven, means for circulating a drying medium in said passes in contact with the material supporting surfaces of said reaches of the conveyor, said hollow partition serving to exclude from said passes a portion of the oven intermediate upper and lower reaches of the belt so as to thereby avoid excessive cross sectional area in said passes whereby the circulation of said drying medium in said passes is facilitated.

4. In apparatus of the class described, an endless belt conveyor supported only at its ends and of such length as to necessarily assume a substantial catenary between its ends, an oven enclosing a reach of said belt, said oven being arched longitudinally to approximate the catenary of said reach and being of such cross-sectional area throughout its length as to provide between the material supporting surface of said reach and a wall of the oven, a passageway of approximately constant cross-sectional area throughout the length of the oven, and means for heating said oven so as to dry material carried through said oven by said conveyor.

EDOUARD M. KRATZ.